April 9, 1968     A. R. BRAULT     3,376,762
SPOTTING PROJECTORSCOPE
Filed Nov. 26, 1965     2 Sheets-Sheet 1
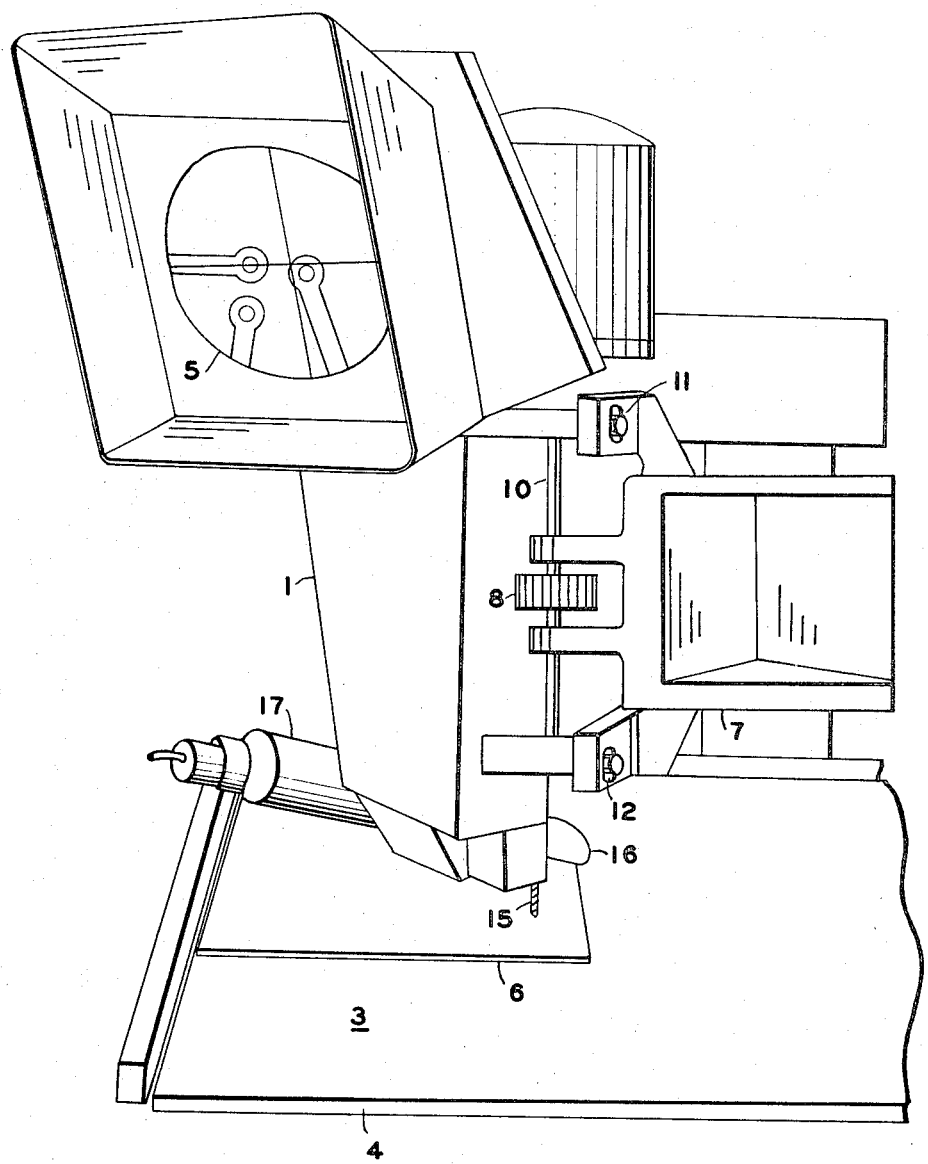
FIG I
INVENTOR.
ANDRE R. BRAULT
BY

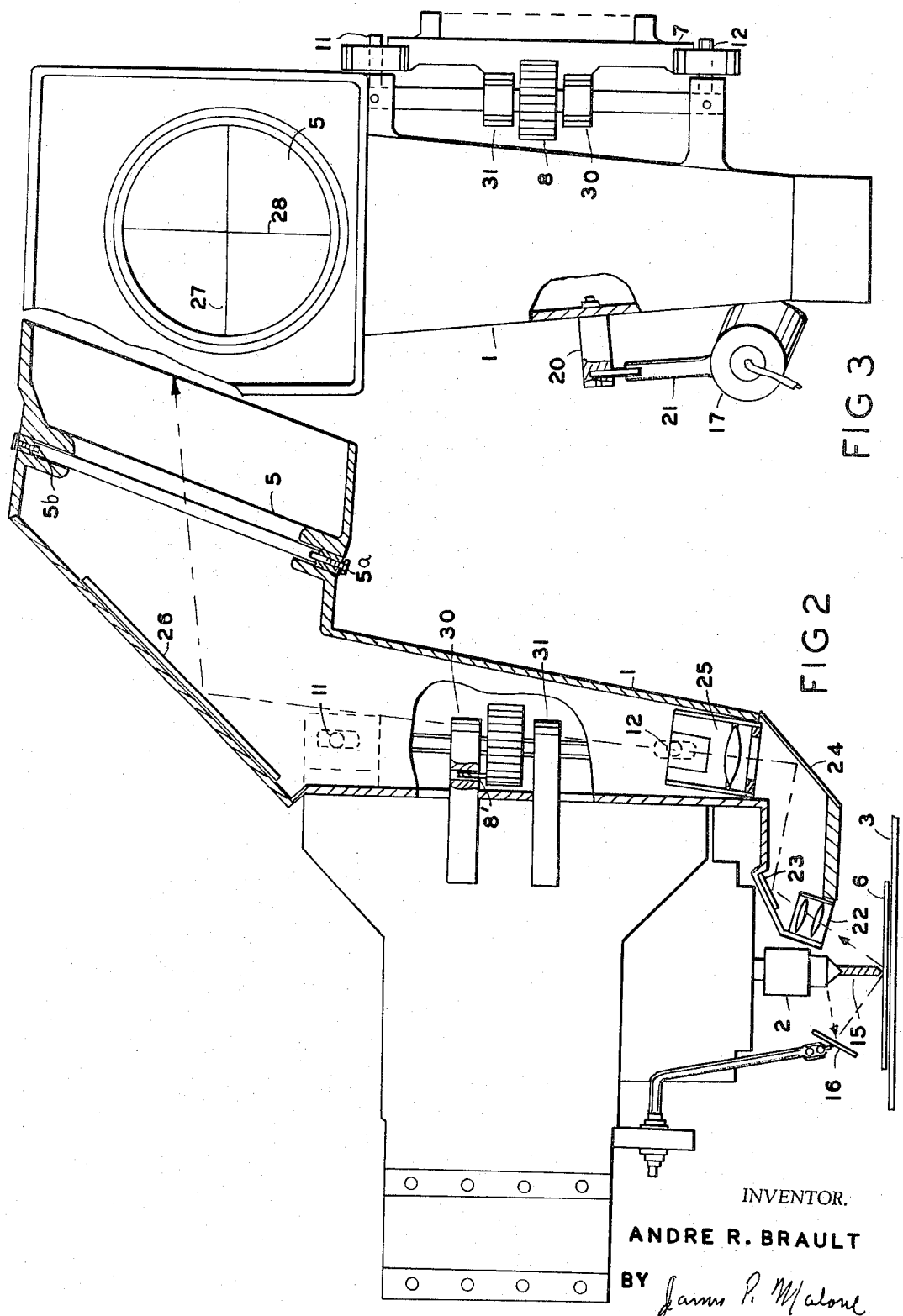

United States Patent Office 3,376,762
Patented Apr. 9, 1968

3,376,762
SPOTTING PROJECTORSCOPE
Andre R. Brault, North Merrick, N.Y., assignor to Optomechanisms, Inc., Plainview, N.Y.
Filed Nov. 26, 1965, Ser. No. 509,707
2 Claims. (Cl. 77—5)

ABSTRACT OF THE DISCLOSURE

This invention relates to an enlarger-projector for use in a work layout machine for instance, of the type having a movable mounting drill head and drill bit. An enlarger-viewer is mounted adjacent to the drill head on a layout drilling machine to aid in optically position the work piece relating the drill. The magnified image, when centered on the screen, is the precise point the drill will contact.

---

This invention relates to an enlarger-projector for use in a work layout machine for instance, of the type having a movable mounting drill head and drill bit.

The invention is an optical comparator designed to mount adjacent to the drill head on a layout drilling machine and optically pre-positions the drill to the point to be drilled. The projectorscope does this remotely without interference with the drilling screen.

The magnified image, when centered on the screen, is the precise point the drill will contact. The viewing screen is of the reticle design, engraved with index lines and crosshairs to simplify the centering operation.

A surface illumination system provides an image completely bright in full shop light. The screen is tilted at an angle to deflect overhead glare. A focusing adjustment is provided for variable thicknesses of work height.

More particularly the invention comprises a casing, means to adjustably mount said casing on the drill head, a viewing screen mounted in said casing, means to project an enlarged image of the work piece area directly under said drill head to said viewing screen comprising, a pickup lens mounted at the bottom of said casing adjacent the drill bit, a source of illumination mounted adjacent the bottom of said casing, a reflecting mirror mounted in fixed relation to the bottom of said casing and adapted to reflect illumination from said source onto said image area and onto said pickup lens, and an enlarging lens system adapted to transmit said image to said viewing screen.

Accordingly, a principal object of the invention is to provide new and improved means to locate spots on a work layout machine.

Another object of the invention is to provide new and improved means to present to the operator a magnified view of the position to be marked or drilled resulting in greater accuracies and reducing fatigue as occasioned from conventional means of drilling.

Another object of the invention is to provide new and improved means for attaching a projectorscope to any drilling machine, thus improving its accuracy of locating the work piece.

Another object of the invention is to provide new and improved enlarger-projector means for proving an enlarged view of a portion of the work piece.

Another object of the invention is to provide new and improved means for a work layout machine of the type having a movable drill head and drill bit, for spotting the tool accurately in location.

Another object of the invention is to provide new and improved means in a work layout means of the type having a movable drill head, drill bit and means to move said drill head over a work piece comprising a casing, means to adjustably mount said casing on said drill head, a viewing screen mounted in said casing, and means to project an enlarged image of said work piece area directly under said drill head to said viewing screen.

Another object of the invention is to provide new and improved enlarged viewing of the drilling operation while the work piece is being drilled or worked on.

Another object of the invention is to provide new and improved means for projecting and enlarging an image of a portion of the work area in connection with a work piece including means to index the work piece.

These and other objects of the invention will be apparent from the following specification and drawings of which:

FIGURE 1 is a perspective view of the embodiment of the invention.

FIGURE 2 is a side view partly in section of the embodiment of the invention.

FIGURE 3 is a front view of the embodiment of FIGURE 2.

Referring to the figures, the invention generally comprises a casing 1 which is adapted to be mounted with a predetermined space relation to the drill head 2, the drill head being of the type which is adapted to be moved over the work area 3 of the table 4. Typical work layout machines are shown in my patents, Patent No. 2,995,826 granted Aug. 15, 1961 entitled Layout Machine and Patent No. 3,212,194, granted Oct. 19, 1965 entitled Automated Work Layout Means.

Adjacent the top of the casing is mounted a viewing screen 5 which is adapted to show an enlarged view of a small portion of the work piece 6 and which may for instance be a printed circuit board. The screen is preferably tilted down to avoid reflection glare.

More specifically, the casing 1 is adjustably mounted on the bracket 7 and the adjustable knob 8 permits the casing to be raised or lowered to accommodate different thicknesses of the work piece. The casing is mounted on threaded shaft 10 and upper and lower pin and slot connections 11 and 12. Therefore, when the knob 8 is turned, the casing may be raised or lowered, for focusing on different thickness work pieces. The knob 8 is spring loaded by the means of spring 8' to eliminate backlash.

Referring now to the FIGURES 2 and 3, FIGURE 2 is a side view partly in section. The casing is mounted as previously described on the bracket 7 by means of slot and pin connections 11 and 12 and the vertical adjustable means comprising the knob 8 and the threaded shaft 10. The shaft 10 is fixedly connected to the casing 1 at each end and is supported by guide brackets 30 and 31. The guide members and the pin and slot guides restrain all motion of the casing except vertical adjustment. The drill bit 15 extends down to the adjacent work piece W. The lower end of the casing 1 is L-shaped and its bottom end extends adjacent to one side of the drill bit 15 slightly above the surface of the work piece 6.

On the other side of the drill bit 15 from the lower end of the casing 1 is mounted a mirror 16 which is adjustably mounted on a portion of the bracket 7. A source of illumination 17 is adjustably mounted on the outside of the lower portion of the casing by means of an adjustable bracket 20 which is adjustably rotatable about one axis. The light 17 is also rotatable about the axis of the connecting member 21 so that it has full adjustment in all planes. The light 17 transmits light onto the mirror 16 which reflects it to the work area under the drill bit 15 when it is reflected up to the pickup end of the casing 1.

More specifically, the light is reflected from the work area to a pickup lens 22 and the image is then reflected by the mirror 23 mounted inside the casing to a second mirror 24 mounted in the inside of the elbow of the casing and thence up through an enlarging lens 25 to a large mirror 26 on the interior of the upper side of the casing from which the enlarged image is reflected onto the viewing screen 5. The viewing screen 5 is adjustably mounted for lateral adjustment in the casing means by means of the adjustment screws 5a, 5b, etc. The viewing screen has crosshairs 27 and 28 for the purpose of accurately locating the image of the spotting point. For various applications the crosshairs may be substituted for by a series of concentric circles or squares or scales or any manner of reticle which simplifies positioning of the work piece.

When the projectorscope is first connected to the drill head, the various elements must be properly aligned which may be done by drilling a hole in a sample of the work piece and centering the image of the spotted hole by adjusting the mounting screws and by adjusting the mirror 16 and screen 5 in relation to each other.

Thereafter no further adjustment is required unless the thickness of the work piece changes then the height of the scope is adjustably changed by the knob 8. The lens and mirror system inside the casing does not require any further adjustment. As the thickness of the work piece changes and focus is adjusted the precise location of center line of the drill and the reticle pattern of the focus screen is not altered.

The projectorviewer of the present invention has been specifically illustrated with a work layout machine of the type having a movable drill head. However, it is not limited to this particular application but may be used for other viewing apparatus for instance, for photographs, maps, etc.

Many modifications may be made by those who desire to practice the invention without departing from the scope thereof which is defined by the following claims:

I claim:
1. In a work layout means of the type having a drill head, a vertical drill bit and means to mount said drill head over a work piece comprising,
   a casing,
   means to mount said casing on said drill head with vertical focusing adjustment,
   a viewing screen mounted in said casing,
   and alignment lines on said screen to align said work piece and said drill bit comprising means to project an enlarged image of said work piece directly under said drill head to said viewing screen.
2. Apparatus as in claim 1 wherein said projecting means comprises,
   a pickup lens mounted at the bottom of said casing adjacent said drill bit,
   a source of illumination mounted adjacent the bottom of said casing,
   a reflecting mirror mounted on the other side of said casing in predetermined relation to the bottom of said casing and adapted to reflect illumination from said source onto said image area and onto said pickup lens,
   and an enlarging lens system adapted to transmit said image to said viewing screen.

References Cited
UNITED STATES PATENTS

| | | | |
|---|---|---|---|
| 2,197,308 | 4/1940 | Kolb et al. | 88—24 |
| 2,249,121 | 7/1941 | Drescher | 88—24 |
| 2,268,293 | 12/1941 | Lundeberg | 77—5 X |
| 2,485,355 | 10/1949 | Brennan | 88—24 |
| 2,489,789 | 11/1949 | Korkosz | 88—24 |

FRANCIS S. HUSAR, *Primary Examiner.*